June 16, 1964 R. C. HENDRICK 3,137,462
CONTROL APPARATUS FOR A CRAFT
Filed April 24, 1962 4 Sheets-Sheet 1

INVENTOR.
RUSSELL C. HENDRICK
BY
ATTORNEY.

June 16, 1964 — R. C. HENDRICK — 3,137,462
CONTROL APPARATUS FOR A CRAFT
Filed April 24, 1962 — 4 Sheets-Sheet 2

INVENTOR.
RUSSELL C. HENDRICK
BY *Gordon Reed*
ATTORNEY.

INVENTOR.
RUSSELL C. HENDRICK
BY Gordon Reid
ATTORNEY.

United States Patent Office 3,137,462
Patented June 16, 1964

3,137,462
CONTROL APPARATUS FOR A CRAFT
Russell C. Hendrick, Fridley, Minn., assignor to Minneapolis-Honeywell Regulator Company, Minneapolis, Minn., a corporation of Delaware
Filed Apr. 24, 1962, Ser. No. 189,932
14 Claims. (Cl. 244—77)

This invention pertains to control apparatus of the adaptive type for controlling a condition. Such adaptive control apparatus includes provisions for continuously monitoring the system's performance in relation to a given figure of merit or optimum performance and a means of automatically modifying the system's parameters, by closed loop action, to approach this optimum performance.

An adaptive automatic condition control apparatus of this general type and which has been applied to control of an aircraft is described in "Space/Aeronautics" February 1959, pages 128–131 by R. C. K. Lee, L. T. Prince, and R. N. Bretoi and reference may be made thereto for background material. More particularly, the present invention is an improvement or modification in prior adaptive control systems such as that disclosed in an application of Remus Bretoi, Serial No. 12,055, filed March 1, 1960 and the adaptive system in application Serial No. 75,954 filed December 15, 1960 by Robert C. K. Lee.

Both of the above adaptive control systems include a model that determines a desired performance and what has been termed a gain changer for the control apparatus for modifying system performance so that it approaches the desired performance. The present invention relates to an improvement of such gain changer for an adaptive control system that is intended to operate at or around the critical gain. The improvement herein may be viewed with respect to the adaptive type automatic control system as disclosed in the aforesaid Bretoi application. Such Bretoi system as it operates has a limit-cycle indicating system operation at the critical gain and therefore, close following of the model output. The limit cycle amplitude is determined by the adjustment of a set point in a gain computer and wherein a simple frequency band pass plus rectifier detection circuit measures the actual amplitude of the limit cycle as reflected in the operation of the servomotor. The amplitude of outputs of the set point and of the rectifier are algebraically combined to adjust the gain of the adaptive controller. As the output of the rectifier approaches in magnitude the amplitude of the setpoint, the gain is reduced to thereby limit the amplitude of the limit cycle at the critical frequency which is the limit cycle frequency. If the setpoint amplitude be greater than the amplitude of output of the rectifier, the gain of the adaptive control is increased to insure close following of the model output. Such Bretoi system, however, does not take into account a condition affecting the above detection circuit which in one instance, in the liquid fueled vehicle, may be termed fuel sloshing. A similar effect on the detection circuit may be caused by other factors, and may be similarly compensated for, but the effect on the detection circuit due to fuel sloshing will be taken here as representative of such factors.

Sloshing of the fuel in a vehicle such as an aircraft in flight may be initiated by linear acceleration of the vehicle or by other disturbances. It is appreciated that baffles in the tanks storing the fuel have a damping effect on such sloshing, but nevertheless it is still present. This fuel sloshing could transiently alter the position of the center of gravity of the vehicle and thus cause adverse oscillations of the vehicle or airframe in flight. The vehicle having an adaptive control system also incurs oscillations due to the cyclic displacement of its attitude control surface by the servomotor or actuator which also has an oscillation frequency termed its limit cycle frequency. The adverse fuel sloshing can also cause a craft or vehicle limit cycle which passes through the above filter and rectifier provided primarily for the limit oscillations which oscillations are due to the servo operation. Such oscillations caused by fuel sloshing pass through the filter and rectifier and cause the gain changer to drive the amplifier gain too low. When the gain is thus driven to a low value, there generally results a relatively low frequency oscillation from lack of vehicle aerodynamic damping. Such vehicle may in addition have an oscillation inherent therein which if not controlled by the adaptive apparatus would result in the vehicle becoming "lost."

Thus an object of this invention is to prevent factors such as "fuel sloshing" from having an adverse effect on the adaptive controller gain changer of an adaptive control apparatus.

A further object of this invention is to prevent inadequate gain in the control system which uses an adaptive controller.

A further object of this invention is to prevent any inadequate gain by including an "up logic" through the basic gain changer of an adaptive system of the type disclosed in the aforesaid Bretoi application.

The above and other objects of the invention will become apparent upon consideration of the accompanying description and subjoined drawing disclosing an embodiment thereof.

Referring to the drawings:

FIGURE 1 in block form shows the basic elements of the adaptive control system;

As background to the detailed description, the adaptive control apparatus herein utilizes a model which is an electrical analog having a transfer function which represents the desired response or operation of the combined control apparatus and aircraft to a control signal. Depending upon whether the pitch axis or roll axis of an aircraft is being controlled, the model may be of the second or first order. In such arrangement as mentioned wherein a model is utilized to set up the standards of performance, a high gain servoloop is required to position attitude changing means on the craft thereby altering the craft flight path in order that the aircraft follow the output of the model. A sensor responsive to changes in craft flight path has its output compared with the model output to develop an error signal indicating the difference between desired and actual performance.

Figure 1:
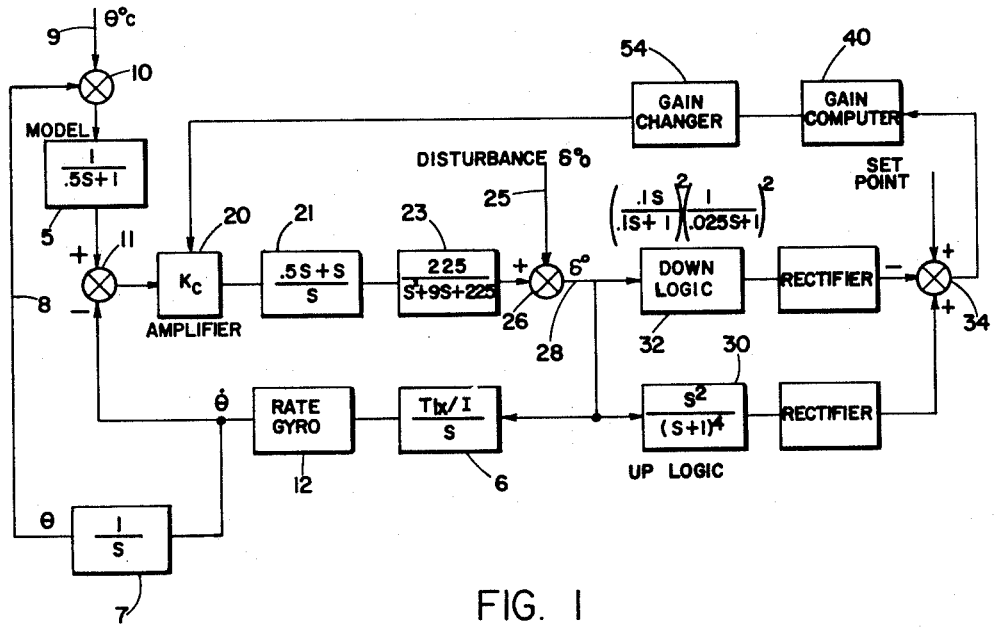

Referring to FIGURE 1, an analog model 5 receives control signals from a summing point 10 receiving both a pitch attitude command $\theta°$ C. in degrees from transmission means 9 and a sensed pitch attitude signal $\theta$ from the transmission means 8. In the present instance, the sensed pitch attitude signal is obtained by integrating the craft pitch rate $\dot{\theta}$ through an integrator 7. The output of analog model 5 is applied to a second summing point 11 which also receives the sensed pitch rate signal $\dot{\theta}$ from rate gyro 12 or response of the controlled aircraft. The craft is represented as a simplified vehicle having the transfer function as shown in device 6. The output from summing point 11 is the error signal or difference between desired and actual craft performance and is applied to a variable gain amplifier 20 thence through a proportional plus integral network 21 to control a servomotor 23. Servomotor 23 operates a control surface or attitude changing means of an aircraft causing it to change attitude or flight path.

In addition to the action of the control surface supplying a control moment to the craft, the craft flight is also affected by other disturbances represented as an input 25 to a third summing device 26 so that the overall response of the aircraft is applied to transmission means 28.

This overall response controls the adaptive system gain changer, thus it is applied through a lower filter 30 which may be termed the "up logic filter" and through a second filter in parallel with filter 30 termed "down logic" which passes high frequency signals as compared with those passed by filter 30. The outputs of the two filters are compared at a fourth summing device 34. Device 34 also has applied thereto a set point quantity or a selected amplitude of input for determining the maximum amplitude of the limit cycle frequency. The difference between the three signals, that is the outputs of the two filters and the set point amplitude is considered a gain computer error signal. This error signal is applied to a gain computer 40 which in turn through a gain changer 54 linearly varies the output of servo amplifier 20.

Figure 2:
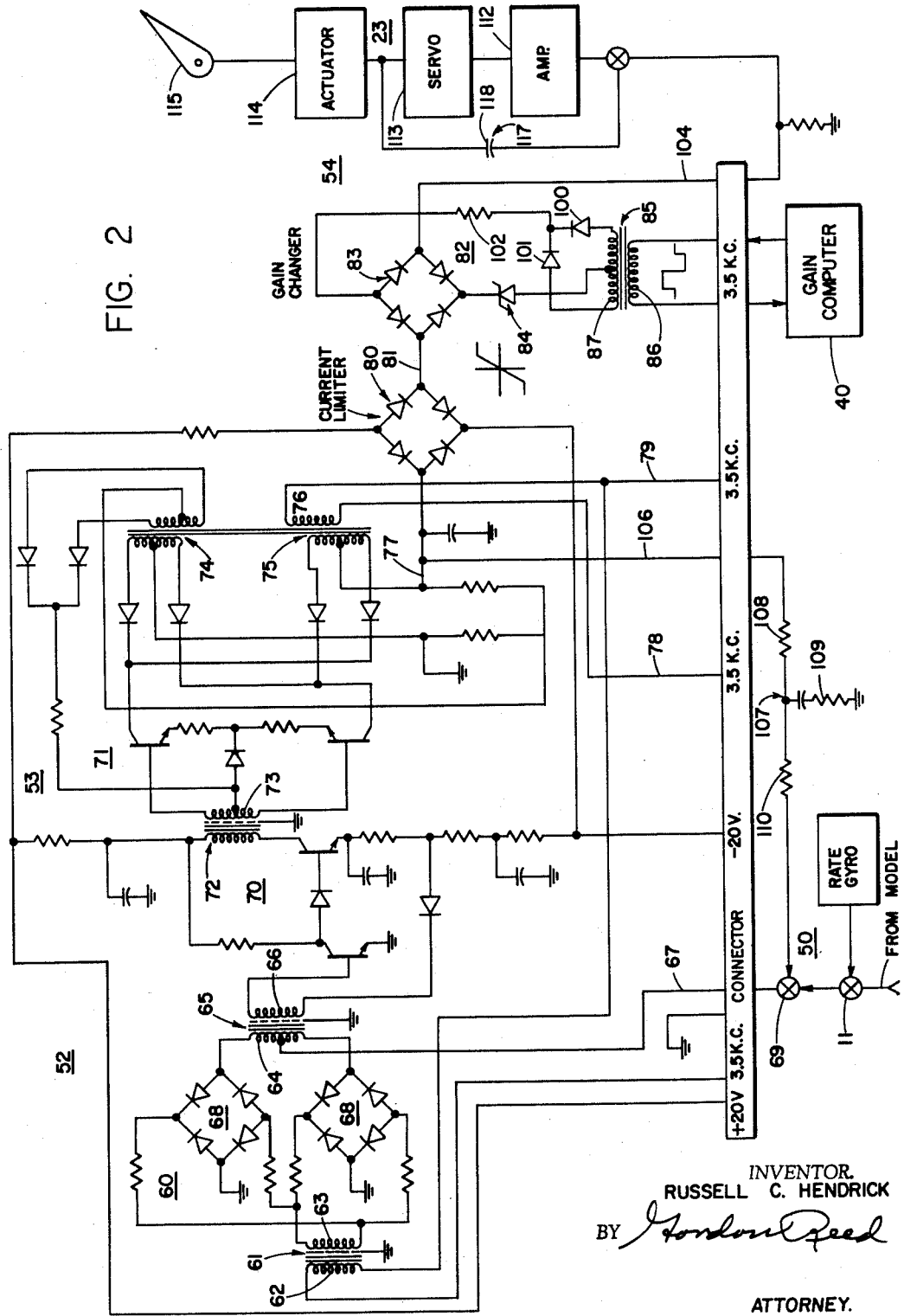
FIGURE 2 is an electrical schematic of the adaptive control apparatus for a control surface of an aircraft with the novel gain computer shown in block form.
Figure 3:
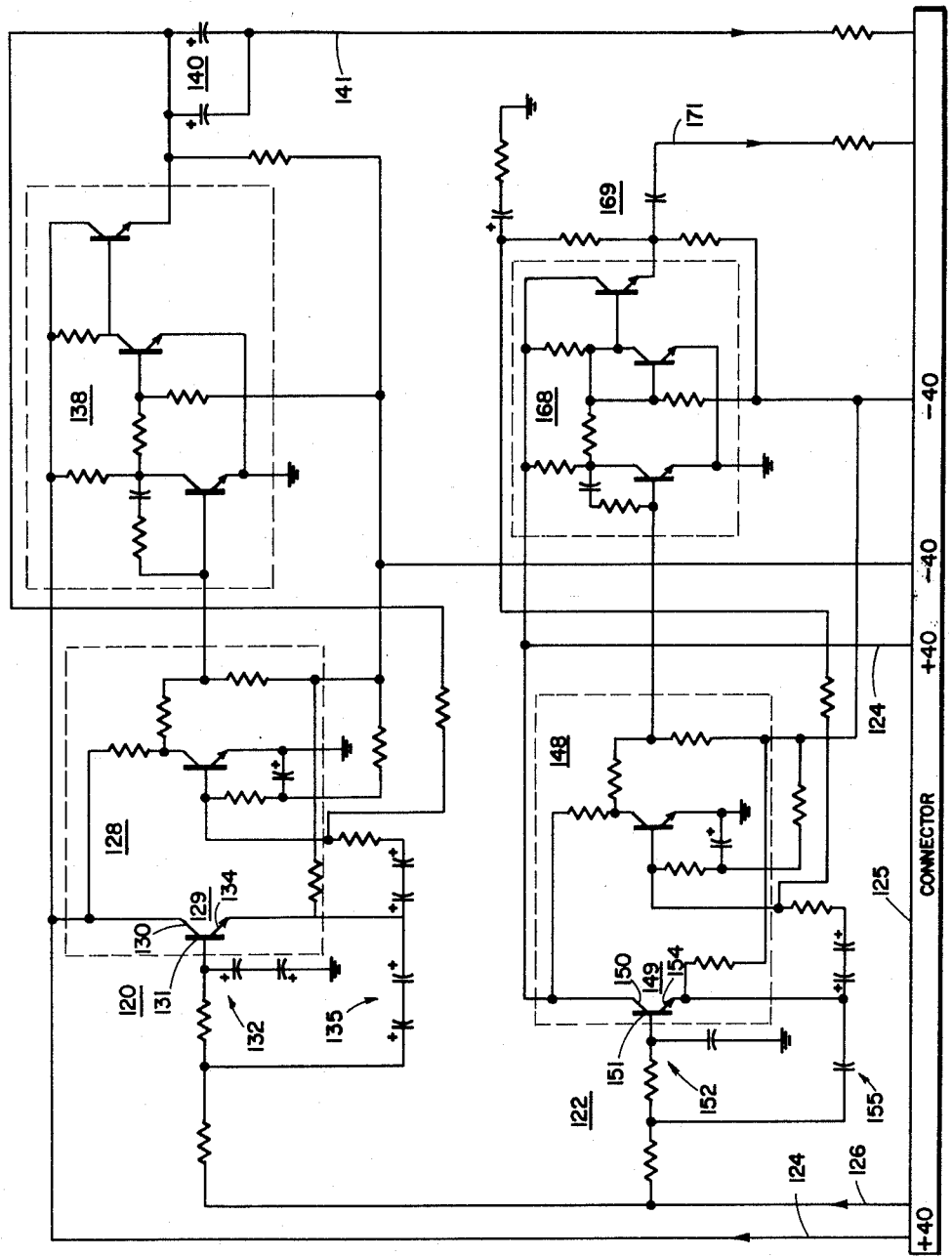
FIGURE 3 is an electrical schematic of the two filter channels forming part of the gain computer.

A physical embodiment of the adaptive control apparatus for the aircraft may take the form of the prior apparatus shown in the Lee application Serial No. 75,954 with the exception of a different form of gain computer for the gain changer of the servo amplifier substituted for the constant control authority computer 23 shown in FIGURE 3 of the Lee application. Thus the system of FIGURE 2 herein comprises a signal providing control section 50, a signal modification section 52 and a utilization section 54. The section 52 includes an amplifier 53 which includes a diode modulator 60, an amplifier section 70, a discriminator section 71, and a limiter 80. The diode modulator 60 includes a transformer 61 having a primary winding 62 energized from a suitable A.C. source supplying for example 3.5 kilocycle voltage thereto. The transformer 61 includes a secondary winding 63 connected to two diode bridges 68, 68 in parallel. On the output side of the diode modulator 60 there is arranged a transformer 65 having a primary winding 64 connected to the diode bridges and with a center tap receiving the D.C. control signal voltages through a conductor 67 from the D.C. control signal source 50.

In the present arrangement, the D.C. control signals are obtained from summing differential 11 which combines the output of model 5, FIGURE 1 and the angular rate of the aircraft derived from rate gyroscope 12. Since the arrangement herein of the invention has been applied to the roll axis of an aircraft, the model 5 has been represented as a first order device rather than a second order device as in the aforesaid Lee application. Since the present arrangement in FIGURE 2 is electrical in nature, the model 5 for providing a first order response may be a suitable electrical analog network of a first order system.

Reverting to the details of section 52, transformer 65 includes a secondary winding 66 which receives the modulated D.C. control signals and amplifies the same through a suitable transistor amplifier arrangement. The output of the amplifier section 70 is applied to a primary winding of a transformer 72 which has its output coupled through the transformer secondary 73 to the amplifier discriminator section 71. Included in the discriminator section 71 are a pair of transformers 74, 75. Transformer 75 has its primary winding 76 energized from an A.C. signal source through conductors 78, 79 extending therefrom. The frequency of this voltage like that applied to primary winding 62 is 3.5 kilocycles. The discriminator amplifier 71 is arranged to provide a D.C. output on the conductor 77 which in turn is supplied to a limiter 80 so that the maximum utilized output of the discriminator 71 or maximum output of limiter 80 is approximately ten volts. Thus the amplifier 53 may be considered nonlinear through the action of the limiter since despite large input signals on conductors 67 there will be a limited output through limiter 80. However, for small signals, the output from the limiter 80 is linear or proportional to input as indicated by an input-output graph immediately therebelow.

Limiter 80 is of the conventional diode arrangement and has D.C. control voltages of plus 20, minus 20 volts applied to opposite terminals or sides thereof. The output from the limiter 80 is supplied to a conductor 81 which in turn is connected to servo amplifier variable gain changer 82.

The gain changer arrangement 82 comprises a diode bridge arrangement 83, a Zener diode 84, a transformer 85, diodes 100, 101 and a resistor 102. The transformer 85 comprises a primary winding 86 which is energized from the novel gain computer 40 to be more fully described in connection with FIGURES 3, 4a and 4b.

As in the aforesaid Bretoi application, the output from the gain computer 40 herein has its voltage applied to transformer winding 86. This voltage is square wave in shape with alternate positive and negative half cycles, with the width of each square wave half cycle being modulated between full width and zero width when necessary to provide the change in gain on the output of gain changer 82. Transformer 85 includes a secondary winding 87 having one end connected through diode 100 and resistor 102 in series, to one side of the diode bridge 83. The opposite end of winding 87 is connected through second diode 101 and the resistor 102 in series to the same side of the diode bridge 83. The opposite side of the bridge 83 is connected through a Zener diode 84 to a center tap of secondary winding 87. By the above arrangement of the diodes 100, 101, the gain changer error signal as appearing at device 34 FIGURE 1 herein a D.C. voltage and which has been converted to an A.C. output supplying transformer winding 86 is again converted to a D.C. voltage.

Regarding the electrical characteristics of the elements of the gain changer 82, the breakdown voltage of the Zener diode 84 is approximately 28 volts and greater than the breakdown voltage of the diodes in diode bridge 83. The amplitude of the voltage supplied through transformer winding 86 is approximately 40 volts and the width of each voltage pulse in winding 86 is in accordance with the magnitude of the D.C. signal out of device 40 FIGURE 1.

Considering the operation from signal modification section 52 through the limiter 80, for small input signals into the diode modulator section 60 from signal input conductor 67 there will be on the output conductor 81 of limiter 80 a small average output. As the magnitude of the D.C. control signal on conductor 67 increases, the output voltage on conductor 81 increases in accordance therewith. In other words there is a linear or proportional variation of limiter output to control signal input. However, when the input control signal on conductor 67 attains a predetermined magnitude, a full D.C. output voltage of ten volts appears on conductor 81. If the signal on conductor 67 thereafter increases additionally in magnitude there is no accompanying additional increase in the voltage on conductor 81.

With respect to the operation of gain changer 82, if the square wave input to transformer winding 86 is of full width as indicated by the wave symbol in FIGURE 2, the output on conductor 104 will be that on conductor 81. If the square wave has half cycle waves of less than full width as represented by the wave symbol to transformer 85, the average output on conductor 104 with respect to the voltage on conductor 81 varies as the ratio of the actual square wave pulse width to full wave pulse width.

The D.C. output voltage on conductor 104 in turn is supplied to a second servo amplifier 112 which differentially energizes in known manner a pair of electrically energized operating windings that control the displacement of a control valve of a hydraulic servomotor 113 in servo means 23. Servomotor 113 in turn operates an actuator 114 that positions the control surface 115 in the aircraft.

The output from the servomotor 113 representing the displacement of the servomotor from a normal position is supplied through a feedback connection 117 to the input side of the amplifier 112. In order to provide a proportional plus integral effect of servo means 23, the feedback arrangement 117 may include a capacitor 118 which provides a hi-pass feedback or discontinuous feedback. Functionwise the capacitor 118 causes the servomotor 113 to act as an integrator at low frequencies and as a proportional control at high frequencies and thus a proportional plus integral control is provided by the above feedback provisions. This proportional plus integral effect is represented in FIGURE 1 by the network 21.

In some instances where it may be desired to apply a phase shift or rate effect to the output of the summing device 11 to the amplifier 20 in FIGURE 1, a lag device 107 may be provided in the feedback loop for amplifier 71 in FIGURE 2 whereby the output on the amplifier conductor 77 is transmitted through the sub-conductor 106 to lag network 107 which is connected through a summing resistor 110 to a further summing differential 69. In the present arrangement, the lag device is shown as of the resistor-capacitor type having a resistor 108 and capacitor 109 connected in series to ground with the terminal of resistor 108 and capacitor 109 being in turn connected through summing resistor 110 to the further summing device 69. This method of obtaining a rate effect through the input of amplifier 20 has been omitted from FIGURE 1 as indicated its inclusion may be optional.

Figure 4B:
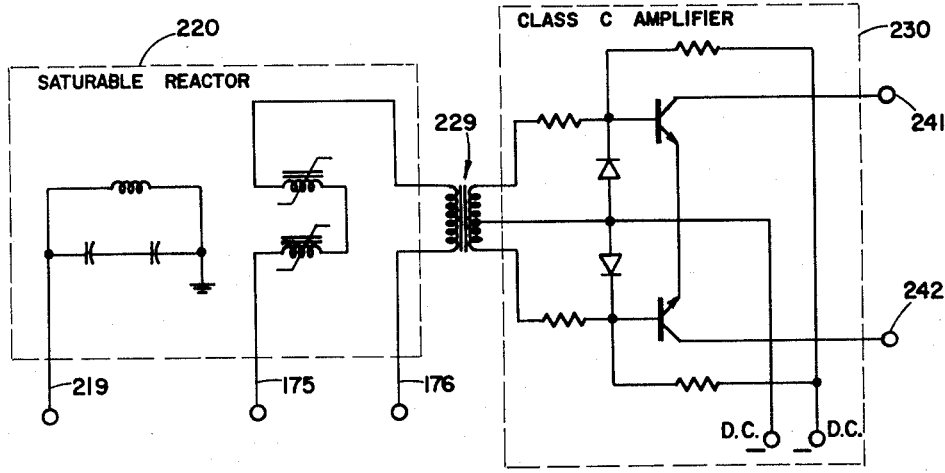
FIGURES 4a and 4b are electrical schematics of the remaining portion of the gain computer shown in block form in FIGURE 2.
Figure 4A:
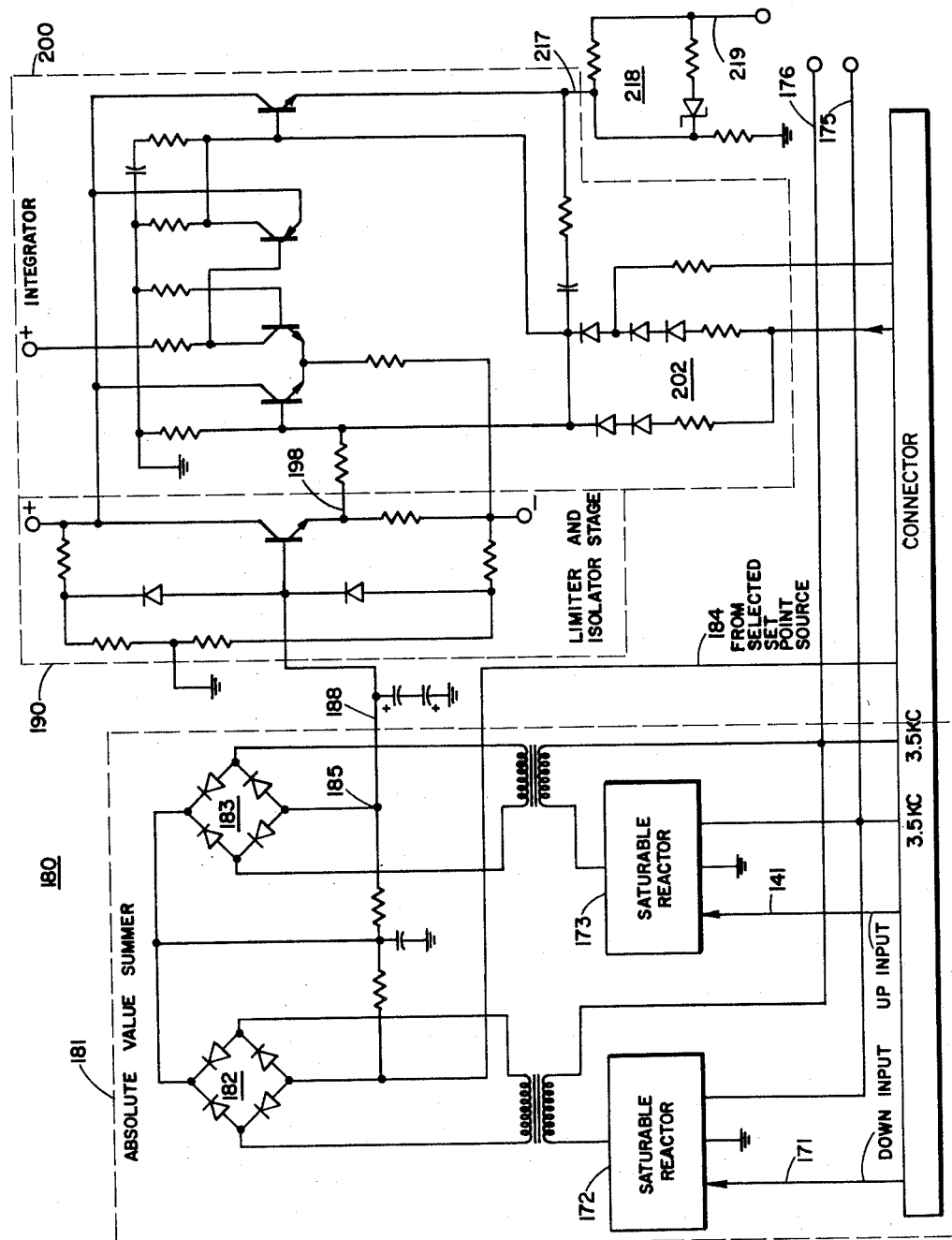

Reference is now made to FIGURES 3, 4a and 4b illustrating one mechanization of a novel gain computer for controlling a gain changer 32 for obtaining an operation of the adaptive system which takes into consideration effects such as due to fuel sloshing in fuel tanks of the craft being controlled.

As indicated initially and reviewed here briefly, the invention herein is concerned with an improvement in the gain computer band pass characteristics whereby to control the gain changer to prevent excessive gain reduction which otherwise might occur during commands as command input on transmission means 9 FIGURE 1 as well as adverse fuel sloshing conditions or effects. The improvement in the band pass characteristics herein is shown in FIGURE 3. In FIGURE 3 there is provided two separate high gain amplifier channels 120, 122 with channel 120 passing frequencies of one magnitude, and the other channel 122 passing frequencies of a different magnitude with the band pass characteristics of the two channels overlapping at other than peak frequencies. The transfer function of both amplifiers is represented by the mathematical expression $$\frac{ks^2}{(1+as)^2(1+bs)^2}$$

where $k$ is the gain of the amplifier, $s$ is the conventional Laplace operator and $a$, $b$ are the time constants of the networks in the amplifiers. In the present arrangement, the band pass high gain amplifier 120 is set to peak at .227 cycle per second roughly and band pass high gain amplifier 122 is set to peak at a higher frequency than amplifier 120 and approximately 1.91 cycles per second.

Now the band pass channel amplifier 122 is provided to peak at or near the basic limit cycle frequency of the adaptive control system which could be taken off the servomotor 113 or from the craft itself and the output therefrom is opposed to the selected or set limit cycle amplitude as at summing device 34 of FIGURE 1. However, a band pass amplifier or band pass filter as herein will also transmit signals at other than the basic frequency. Hence this amplifier 122 may pass low frequency oscillations such as due to fuel sloshing which when combined or reinforced by the limit cycle frequency would tend to drive the gain lower than would otherwise result from merely the limit cycle frequency.

However, the second band pass amplifier channel 120 is provided herein to also pass the low frequency oscillations such as would be generated by fuel sloshing, and its output is opposed to the output from the band pass channel amplifier 122. The band pass channel 120 is made responsive to lower oscillations basically than the limit cycle frequency and since its output is opposed to that from band pass amplifier 122 the output from band pass amplifier 120 is used to prevent further gain reduction.

Thus at the normal system limit cycle frequencies of say 9 radian per second, the gain through the up logic or band pass amplifier 120 is negligible. Thus for normal operation, no change in steady state limit cycle amplitude for a given set point occurs. Any oscillation passed by the up logic or channel 120 causes a gain increase. If a fuel slosh instability occurs at frequencies passed by the "down logic" circuit or channel 122, the gain will be reduced until a balance is achieved between the sloshing oscillation, the low frequency rigid body oscillation, and the gain changer set point.

Returning to channel 120, a first section 128 thereof includes a transistor 129 having conventionally a collector 130 connected through conductor 124 and connector 125 to a plus 40 D.C. voltage source and a base 131 connected through a network 132 to a conductor 126 from connector 125 which supplies a band pass input to both amplifier channel sections 120, 122. The emitter 134 is connected through a network 135 in feedback relation to the input to the base 131.

The output from section 128 is supplied to a second section 138 in turn having its output connected through a network 140 to an output conductor 141 of connector 125 representing the "up logic" output from the low frequency band pass amplifier 120.

Similarly the channel 122 comprises a first section 148 having a first transistor 149 that has its collector 150 connected to plus 40 D.C. voltage source through conductor 124 and its base 151 connected through resistor network 152 to the conductor 126 which provides a band pass input signal. The transistor emitter 154 is connected in feedback relation through network 155 to the input of the base 151. The output from section 148 controls a second section 168 which in turn through network 169 supplies its output to conductor 171 of connector 125 which output represents the "down logic" output which is of opposite sign to the up logic output on conductor 141. The outputs from band pass high gain amplifiers 120, 122 appearing on conductors 141, 171 are supplied to a further section 180 FIGURE 4a of the gain computer.

Section 180 comprises an absolute value summer 181 FIGURE 4a, a limiter and isolation stage 190, an integrator 200, saturable reactor 220 FIGURE 4b, and an amplifier 230 operable as a class C amplifier with suitable control inputs 141, 171, 184 and AC power inputs 175, 176.

In absolute value summer 180, alternating voltage signals transmitted by band pass amplifier channels 120, 122 and appearing on conductors 141, 171 along with a D.C. set point voltage on conductor 184 are combined. The alternating voltages on conductors 141, 171 transmitted through saturable reactors 172, 173 are converted to absolute quantities by rectifier bridge arrangements 183, 182 in a manner well known in the art in order to be electrically combined with the D.C. signal on conductor 184 supplied by an adjustable potentiometer (not shown). The output from rectifier bridge 182 is opposed to the sum of the output from rectifier bridge 183 and the input on conductor 184 and the resultant is applied to terminal 185. From terminal 185 the output from the absolute value summer 181 supplied to conductor 188 and thence to the limiter and isolation stage 190.

The output from limiter and isolation stage 190 is supplied by conductor 198 to integrator 200. The integrator 200 includes a diode arrangement 202 or diode gates to set in the initial conditions. The overall function of the integrator 200 is to maintain the gain of amplifier 20 (FIGURE 1) until a further change in gain of the amplifier is desired.

This integration effect is similar to that provided by the arrangement 63, FIGURE 2 of the prior Bretoi application above. The output from integrator 200 is supplied through a conductor 217, arrangement 218, conductor 219 to saturable reactor 220 FIGURE 4b similar to reactors 172, 173 and its output by transformer coupling 229 applied to the amplifier 230. The output from amplifier 230 appears on terminals 241, 242. Terminals 241, 242 FIGURE 4b in turn are connected to the opposite sides of primary winding 86 of transformer 85 (FIGURE 2) thereby controlling the output of gain changer 82 appearing on conductor 104. The output across primary winding 86 FIGURE 2 from section 230 FIGURE 4b is square wave in shape and is presented by the symbol below winding 86 FIGURE 2. As stated the width of each one-half of the alternate positive and negative half cycles are varied depending upon the average of the output required from gain changer 82 required to perform the desired or selected control of the adaptive system.

Summarizing briefly the novel features concerning the gain computer 40 and particularly the band pass amplifiers of FIGURE 3 thereof, with one decade separation approximately between band pass filters 120 and 122 and the relative gains therein, the added up logic from band pass amplifier 120 has a negligible effect on the normal limit cycle control characteristics. For a conditionally stable system, the up logic band pass amplifier 120 is set to peak at the lower cross-over frequency of the adaptive control system which in the present instance remains relatively constant.

While the invention as shown is applied to an adaptive control apparatus operating a control surface of an aircraft, it is to be understood that the same principles may be applied to controlling the power control member of an aircraft as well.

It will now be apparent that I have provided an improvement in self-adaptive control system, having a variable gain amplifier, utilized to control the craft about the stability point of critical gain and frequency of the control apparatus and craft. Such improvement opposes the unwanted effects on a gain changer for such amplifier, which effects tend to decrease the gain thereof and causing operation of the system below the critical gain, thereby providing close following between the model output of the adaptive system and the response of the control system and craft. Since various details of the construction may be varied through a wide range without departing from the principles of this invention, it is to be understood that the arrangement herein is for illustrative purposes only and that the invention is only limited by the definition thereof in the appended claims.

I claim as my invention:

1. In control apparatus for a dirigible craft, such as aircraft, operable over various magnitudes of air speed and air density and having attitude changing means, an attitude control signal providing means; an analog model of the combined control apparatus and aircraft responsive to said signal and providing an output signal indicative of a desired response of the apparatus-aircraft; a variable gain amplifier controlled by said output signal; motor means controlled by the amplifier and controlling operation of the attitude changing means; a gain computer controlling the gain of the amplifier; a first filter means responsive to a primary limit cycle frequency; a second filter means responsive to lower frequencies than said limit cycle frequencies; adjustable means for providing a selected limit cycle amplitude; and further means controlled by both filter means and the adjustable means operating said gain computer.

2. The apparatus of claim 1, and means responsive to a derivative of the attitude change of the craft and providing a signal to the amplifier in opposition to said model output signal.

3. The apparatus of claim 2, and an attitude sensing means of the craft providing a signal to said model in opposition to said attitude control signal.

4. The apparatus of claim 1 wherein the second filter means is set to peak about one decade below the higher limit cycle frequency of the control apparatus whereby the output of said second filter has a negligible effect on the normal limit cycle control characteristics of the control apparatus.

5. In control apparatus for a dirigible craft such as an aircraft operable over various magnitudes of air speed and having attitude changing means thereon; an attitude sensing device providing a first signal, means providing a second signal which is a derivative of the attitude change of the craft; an amplifier controlled by said two signals; motor means controlled by the amplifier and controlling operation of said attitude changing means; a gain computer controlling the gain of the amplifier; a first filter means responsive to the frequency of the limit cycle operation of the apparatus; a second filter means responsive to lower frequencies than said limit cycle frequency; and means combining said signals from the two filters and controlling said gain computer.

6. The apparatus of claim 5, and means providing a selected limit cycle amplitude signal to said gain computer.

7. In control apparatus for a dirigible craft such as aircraft operable over various magnitudes of airspeed and air density and having flight control means: in combination, an attitude control signal providing means, a model responsive to said signal and providing an output signal indicative of a desired response of the apparatus and craft; a variable gain device controlled by said output signal; motor means controlled by the device and controlling operation of the flight control means of the craft; a gain computer controlling the gain of the device; a first filter means responsive to a limit cycle operation of the apparatus; a second filter means responsive to a different frequency basically than said limit cycle frequency; means for providing a selected limit cycle amplitude; and further means controlled by both filter means and the last named means varying the gain of said device.

8. In an automatic condition control apparatus for a craft having a condition changing device: a closed loop apparatus operating said device comprising an input signal source, a follow-up control signal source responsive to a function of a change of said condition; further means comprising an amplifier responsive to an error signal derived from the difference of the signals from said input signal source and said follow up control signal source; gain control means for said amplifier; and additional means controlling said gain control means and responsive to cyclic motions of said condition changing device, to frequencies other than that present in said cyclic motions, and to a selectively adjustable means.

9. Control apparatus for a dirigible craft such as an aircraft operable over various magnitudes of air speed and air density and having flight control means thereon an attitude control signal providing means; a model responsive to said signal and providing an output signal indicative of a desired response of the apparatus-aircraft; a variable gain device controlled by said output signal; motor means controlled by the device and controlling operation of the flight control means of the craft; a gain computer controlling the gain of the device; a first filter means responsive primarily to limit cycle frequencies such as oscillations of the craft; a second filter means responsive to lower frequencies than said limit cycle frequency; means providing a selected limit cycle amplitude, and further means controlling the gain of said device and in turn controlled so that the second filter means and adjustable means increases the gain of said device while said first filter means opposes the increase in gain of the device.

10. In an adaptive control apparatus for an aircraft operable near its stability point for various flight conditions of said aircraft, means for maintaining operation of said apparatus near said stability point comprising; a first filter means primarily responsive to the amplitude and frequency of a limit cycle of said apparatus, a second filter means responsive to a frequency of lower magnitude than said limit cycle frequency, adjustable means, having an output, setting the limit cycle amplitude; and means opposing the output of the first filter means to the sum of the output of the adjustable means and second filter means.

11. In a self-adaptive control apparatus for an aircraft including a gain changer for modifying operation of said apparatus for various flight conditions, means for adjusting said gain changer comprising: a first band pass filter responsive primarily to the frequency of a limit cycle of the apparatus; a second band pass filter responsive primarily to frequencies lower than the limit cycle frequency of the apparatus; means for rectifying the outputs of the filter means; means for setting up a selected limit cycle amplitude; and means combining the rectified outputs of said two filter means in opposition to obtain their difference and combining said difference with the selected limit cycle amplitude and connected to the gain changer to prevent low frequency oscillations driving the gain too low thereby to lose control of the craft.

12. In control apparatus for a dirigible craft such as an aircraft operable over various magnitudes of air speed and air density and having flight control means thereon, an outer loop operating said flight controlling means comprising, an attitude control signal providing means; a model responsive to said signal and providing an output signal indicative of a desired response of the apparatus-aircraft; a variable gain amplifier controlled by said output signal; motor means controlled by the amplifier controlling operation of the flight control means; an inner loop controlling the gain of the amplifier comprising a gain computer connected to the amplifier and altering the gain thereof, a first band pass filter means responsive primarily to the frequency of the limit cycle operation due to operation of the motor means; a second band pass filter responsive primarily to frequencies of a lower magnitude than said limit cycle frequency; means for providing a selected amplitude of the limit cycle frequency, and means combining the outputs of said first and second filter means and the last named means to prevent low frequency oscillations such as due to fuel sloshing reducing the gain of the amplifier.

13. In an adaptive control apparatus for a craft operable near its stability point for various operating conditions of said craft, means for maintaining operation of said apparatus near said stability point comprising; a first filter means primarily responsive to the amplitude and frequency of a limit cycle of said apparatus, a second filter means responsive to a frequency of lower magnitude than said limit cycle frequency, adjustable means, having an output, setting the limit cycle amplitude; and means opposing the output of the first filter means to the sum of the output of the adjustable means and second filter means.

14. In an automatic condition control apparatus for a craft having a condition changing device: a closed loop apparatus operating said device comprising an input signal source, a follow up control signal source responsive to a function of a change of said condition; further means comprising an amplifier responsive to an error signal derived from the difference of the signals from said input signal source and said follow up control signal source; gain control means for said amplifier; and, algebraic summing means responsive to the magnitude of the cyclic motions of said condition changing device, to the magnitude of frequencies other than those present in said cyclic motions, and to the magnitude of a signal from a selectively adjustable source.

References Cited in the file of this patent
UNITED STATES PATENTS
3,073,554   Kaufman _____ Jan. 15, 1963